United States Patent
Garcia et al.

(10) Patent No.: US 9,693,122 B2
(45) Date of Patent: Jun. 27, 2017

(54) PHOTONIC TRANSCEIVER ARCHITECTURE WITH LOOPBACK FUNCTIONALITY

(71) Applicant: Aurrion, Inc., Goleta, CA (US)

(72) Inventors: John M. Garcia, Santa Barbara, CA (US); Anand Ramaswamy, Goleta, CA (US); Gregory Alan Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 14/615,294

(22) Filed: Feb. 5, 2015

(65) Prior Publication Data

US 2015/0222968 A1     Aug. 6, 2015

Related U.S. Application Data

(60) Provisional application No. 61/936,173, filed on Feb. 5, 2014.

(51) Int. Cl.
*H04B 10/079*     (2013.01)
*H04Q 11/00*      (2006.01)
*H04B 10/40*      (2013.01)

(52) U.S. Cl.
CPC ..... *H04Q 11/0005* (2013.01); *H04B 10/0795* (2013.01); *H04B 10/0799* (2013.01); *H04B 10/07953* (2013.01); *H04B 10/40* (2013.01); *H04Q 11/0003* (2013.01); *H04Q 2011/0016* (2013.01)

(58) Field of Classification Search
CPC ...... H04B 10/07–10/0799; H04J 14/02; H04Q 11/0003; H04Q 11/0005; H04Q 2011/0015; H04Q 2011/0016

USPC ............................ 398/9–38, 43, 79–95, 140
See application file for complete search history.

(56) References Cited

U.S. PATENT DOCUMENTS

| | | |
|---|---|---|
| 5,513,029 A | 4/1996 | Roberts |
| 5,737,105 A | 4/1998 | Ohta et al. |
| 5,748,811 A | 5/1998 | Amersfoort et al. |
| 6,134,032 A | 10/2000 | Kram et al. |
| 6,445,843 B1 * | 9/2002 | Duer ..................... G02B 6/359 385/140 |

(Continued)

FOREIGN PATENT DOCUMENTS

EP      2424141 A2     2/2012

OTHER PUBLICATIONS

"European Application Serial No. 15000324.2, Communication Pursuant to EPC Rule 69 mailed Dec. 14, 2015", 2 pgs.

(Continued)

*Primary Examiner* — Li Liu
(74) *Attorney, Agent, or Firm* — Schwegman Lundberg & Woessner, P.A.

(57) ABSTRACT

Embodiments describe transceiver architectures to enable 'loopback' operation, thereby allowing or on-chip or intra module characterization of the transceiver. This includes but is not limited to tests such as bit error rate (BER) characterization, received power characterization and calibration of filters (MUX, DMUX etc.) present in the transceiver. Embodiments may also describe architectures for superimposing low-speed data on to the signal coming out of a transmitter, which in turn enables low frequency communication between network elements in the external link.

13 Claims, 11 Drawing Sheets

(56) References Cited

U.S. PATENT DOCUMENTS

| | | | |
|---|---|---|---|
| 6,714,715 B2 | 3/2004 | Johnson | |
| 6,882,772 B1 | 4/2005 | Lowery et al. | |
| 7,079,715 B2 | 7/2006 | Kish, Jr. et al. | |
| 7,099,382 B2* | 8/2006 | Aronson | H04B 10/40 375/219 |
| 7,123,405 B2 | 10/2006 | Yokoyama et al. | |
| 7,369,719 B2 | 5/2008 | Bernasconi et al. | |
| 7,466,882 B2 | 12/2008 | Kish, Jr. et al. | |
| 7,477,847 B2* | 1/2009 | Hofmeister | H04B 10/40 370/220 |
| 7,561,855 B2* | 7/2009 | Hofmeister | H04L 1/243 455/231 |
| 7,787,774 B2* | 8/2010 | Nelson | H04B 10/40 398/135 |
| 7,826,693 B2 | 11/2010 | Agashe et al. | |
| 7,933,518 B2* | 4/2011 | Li | H04B 10/40 398/137 |
| 8,125,707 B2 | 2/2012 | Kim et al. | |
| 8,135,274 B2 | 3/2012 | Zhang et al. | |
| 8,280,243 B2* | 10/2012 | Ito | H04B 1/74 398/2 |
| 8,320,760 B1* | 11/2012 | Lam | H04J 14/002 398/66 |
| 8,699,831 B2* | 4/2014 | Thylen | G02F 1/065 385/14 |
| 8,831,436 B2 | 9/2014 | Evans et al. | |
| 2003/0194233 A1 | 10/2003 | Casanova et al. | |
| 2004/0008965 A1* | 1/2004 | Betty | G02F 1/2257 385/140 |
| 2004/0096214 A1 | 5/2004 | Morreale et al. | |
| 2004/0126050 A1* | 7/2004 | Claydon | G02B 6/4206 385/14 |
| 2005/0169585 A1* | 8/2005 | Aronson | H04L 25/242 385/89 |
| 2006/0245754 A1* | 11/2006 | Valette | C03C 21/00 398/43 |
| 2007/0019966 A1 | 1/2007 | Chiu et al. | |
| 2007/0092197 A1* | 4/2007 | Mitchell | H04J 14/0227 385/140 |
| 2008/0013881 A1* | 1/2008 | Welch | G02B 6/12004 385/14 |
| 2009/0080892 A1 | 3/2009 | Chang et al. | |
| 2010/0150547 A1 | 6/2010 | Xia et al. | |
| 2010/0325298 A1* | 12/2010 | Nelson | H04L 63/126 709/229 |
| 2011/0069950 A1* | 3/2011 | Ito | H04B 1/74 398/9 |
| 2012/0170931 A1* | 7/2012 | Evans | H04J 14/0227 398/48 |
| 2012/0170938 A1* | 7/2012 | Evans | H04B 10/073 398/91 |
| 2014/0043050 A1 | 2/2014 | Stone et al. | |
| 2014/0126905 A1* | 5/2014 | Yonenaga | H04B 10/506 398/48 |
| 2014/0185980 A1* | 7/2014 | Lei | G02B 6/12004 385/14 |

OTHER PUBLICATIONS

"European Application Serial No. 15000324.2, Extended European Search Report mailed Nov. 6, 2015", 11 pgs.

Almeida, V. R., et al., "All-Optical Control of Light on a Silicon Chip", Nature, 431(7012), (2004), 1081-1084.

Chiu, K. T, et al., "An InP-Based Monolithically Integrated Reconfigurable Optical Add-Drop Multiplexer", IEEE Photonics Technology Letters vol. 19(19), (Oct. 2007), pp. 1445-1447.

Nagarajan, Radhakrishnan, "Monolithic, 10 and 40 Channel InP Receiver Photonic Integrated Circuits with On-Chip Amplification", National Fiber Optic Engineers Conference, (May 4, 2015), 3 pgs.

Smith, M. K, et al., "PHASAR-based WDM-devices: Principles, design and applications", IEEE Journal of Selected Topics in Quantum Electronics vol. 2(2), (Jun. 1996), pp. 236-250.

Suzaki, Y, et al., "Multi-channel modulation in a DWDM monolithic photonic integrated circuit", 14th Indium Phosphide and Related Materials Conference, pp. 681-683, May 2002.

Tachikawa, Yoshiaki, et al., "Arrayed-Waveguide Grating Multiplexer with Loop-Back Optical Paths and Its Applications", Journal of Lightwave Technology vol. 14(6), (Jun. 1996), pp. 977-984.

Young, M. G, et al., "A 16×1 Wavelength Division Multiplexer with Integrated Distributed Bragg Reflector Lasers and Electroabsorption Modulators", IEEE Photonics Technology Letters vol. 5(8), (Aug. 1993), pp. 908-910.

Zirngibl, M, et al., "12frequency WDM laser based on a transmissive waveguide grating router", Electronics Letter vol. 30(9), (Apr. 28, 1994), pp. 701-702.

\* cited by examiner

PHOTONIC TRANSCEIVER ARCHITECTURE WITH LOOPBACK FUNCTIONALITY

PRIORITY

This application claims the benefit of U.S. Provisional Application No. 61/936,173 ("PHOTONIC TRANSCEIVER ARCHITECTURE WITH LOOPBACK FUNCTIONALITY") filed Feb. 5, 2014, the entire contents of which are hereby incorporated by reference herein.

FIELD

Embodiments of the disclosure generally pertain to the optical devices and more specifically to optical transceivers.

BACKGROUND

Optical wavelength division multiplexing (WDM) transmitters and receivers are used in optical transmission networks for transmitting large volumes of data. Optical transmitters and receivers comprise at least one optical multiplexer and one optical de-multiplexer, respectively. The optical multiplexer of a WDM transmitter has a plurality of channel input ports; optical channel signals of these input ports be combined into one multi-wavelength WDM signal for output. The optical de-multiplexer of a WDM receiver has a WDM input port to receive a multi-wavelength WDM input. The de-multiplexer splits the optical WDM reception signal into the individual channel signals and feeds each of these to an allocated channel output port.

Optical transceivers comprise both transmitter and receiver units. An integrated multi-wavelength WDM transceiver is a transceiver in a compact platform that allows multiple streams of data to be simultaneously placed on a single physical input and output (I/O) port using multiple optical WDM wavelengths from an array of lasers operated at the optical WDM wavelengths. Existing photonic transceiver architectures consist of optical transmit and receive paths physically isolated/separated such that when an optical link has to be formed between the transmit and receive path, it is necessarily an external optical link to the module (or in the case of photonic integrated circuit (PIC) based transceivers, external to the PIC). The problem with these transceiver architectures is that calibration and functional verification of the individual transmit and receive sections is limited to solutions that require a physical optical connection to be made external to the unit. Moreover, when the transceiver needs to be set to "normal" operation mode, this external connection has to be physically disconnected.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DESCRIPTION

Embodiments of the disclosure describe high efficiency optical waveguide transitions for heterogeneous optical devices. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

Figure 1:
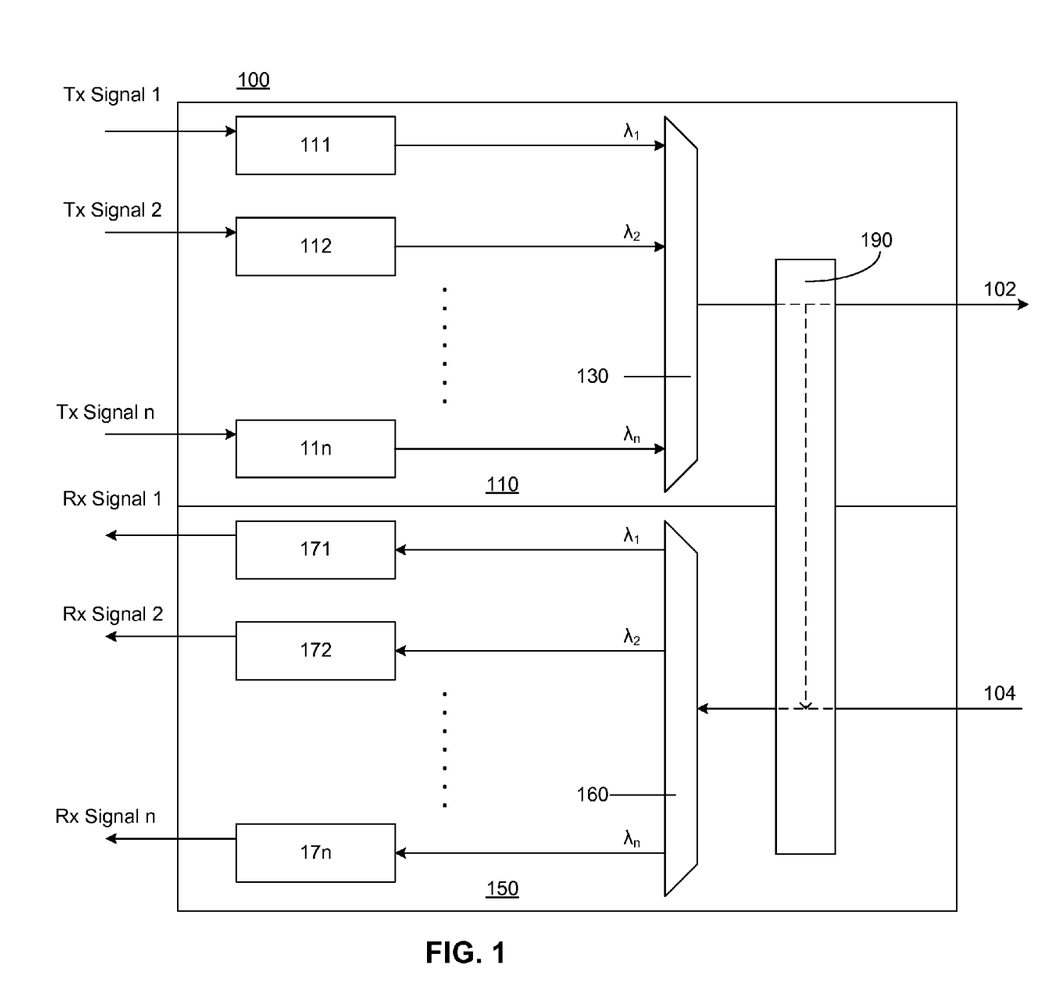
FIG. 1 illustrates a multi-wavelength optical transceiver comprising an integrated loopback optical path according to an embodiment of the disclosure.

FIG. 1 illustrates a multi-wavelength optical transceiver comprising an integrated loopback optical path according to an embodiment of the disclosure. Optical fiber transmission systems may use optical wavelength division multiplexing (WDM) transceivers to transmit and receive data by combining a number of different optical channels or signals at different WDM wavelengths onto a single fiber. Light at these WDM wavelengths is modulated as optical signals at different WDM wavelengths to carry different signal data. Optical WDM transceivers, according to embodiments of the disclosure, may be in various configurations where each transceiver includes a transmitter portion that transmits one or more optical WDM signals and a receiver portion that receives one or more optical WDM signals. Transceiver 100 comprises an multi-wavelength WDM transceiver integrated on a photonic integrated circuit (PIC) and comprising transmission and reception modules—i.e., transceiver 100 comprises an optical device in a compact platform that allows multiple streams of data to be simultaneously placed on a one or more physical input and output (I/O) ports using multiple optical WDM wavelengths from an array of lasers operated at the optical WDM wavelengths.

In this embodiment, transceiver 100 includes transmitter module 110 for generating output WDM signal 102 having n different WDM wavelengths. These different WDM wavelengths may be based, for example, on, the L, C and S bands for WDM applications. Transmitter module 110 includes tunable laser modules 111-11$n$ to generate light, which may be further modulated based on transmission signal data. Said laser modules and modulators may be integrated or discrete components (not shown). Multiplexer 130 is shown to receive n modulated signals and outputs WDM output signal 102 that comprises multiple output channels within a WDM spectral band.

Transceiver 100 further includes receiver module 150 including de-multiplexer 160 to receive WDM input signal 104 and output the received signal at different WDM wavelengths along n different optical paths. In this embodiment, optical detectors 171-17$n$ are included in the n optical paths and convert the de-multiplexed signals of WDM input signal 104 into n reception data signals for further processing.

In this embodiment, transceiver 100 further includes integrated loopback path 190 for selectively routing WDM output signal 102 to receiver module 150. Loopback path 190 allows for on-chip or intra module characterization of transceiver 100—including, but not limited to, tests such as bit error rate (BER) characterization, received power characterization and calibration of filters (e.g., multiplexer 130, de-multiplexer 160, etc.) present in the transceiver.

Figure 2A:
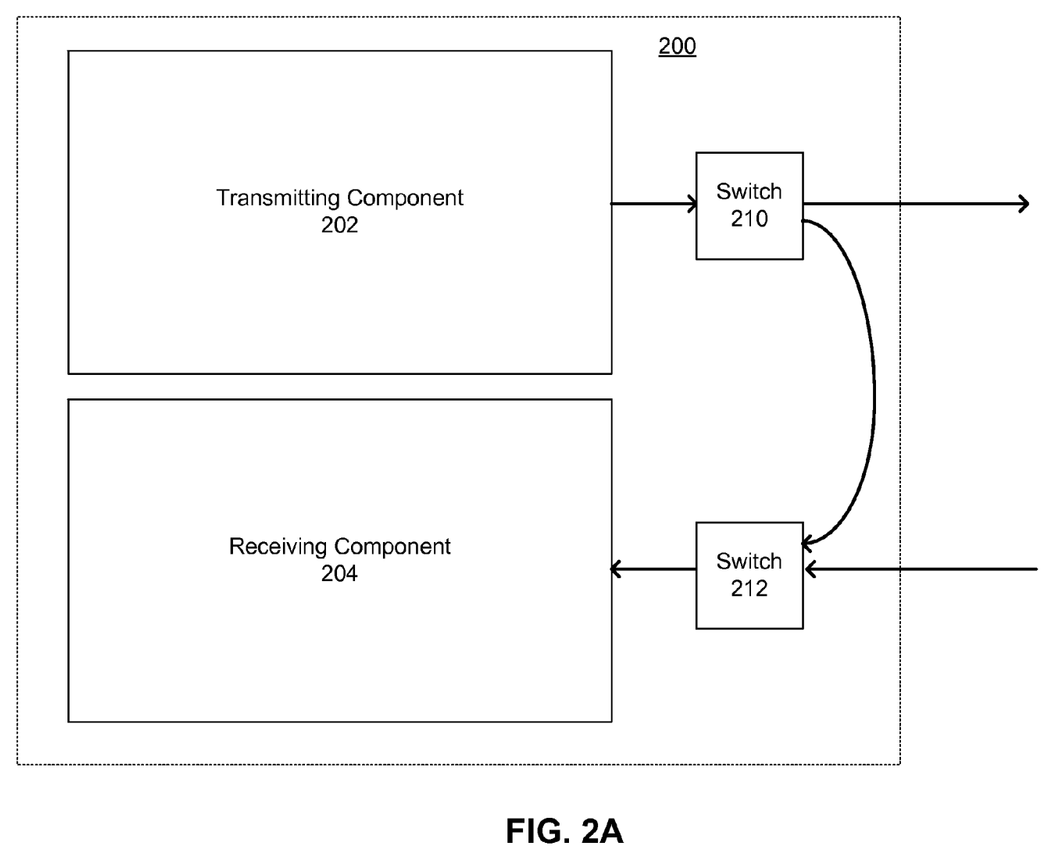
FIG. 2A illustrates a multi-wavelength optical transceiver comprising an integrated loopback optical path according to an embodiment of the disclosure.

FIG. 2A illustrates a multi-wavelength optical transceiver comprising an integrated loopback optical path according to an embodiment of the disclosure. In this embodiment, transceiver 200 includes transmitting component 202 configured to transmit a multi-wavelength signal, and receiving component 204 configured to receive a multi-wavelength signal.

In this embodiment, optical switch 210 may receive a control signal to direct the output of transmitting component to be output from transceiver 200, or to be received by receiving component 204 (via optical switch 212). Optical switch 212 may similarly be controlled such that receiving component 204 may receive a multi-wavelength signal from a component external and communicatively coupled to transceiver 200, or to receive the multi-wavelength signal from transmitting component 202.

Thus, embodiments of the disclosure eliminate the need for an external optical link to the module to form an optical link between the transmit and receive paths of a transceiver, thereby eliminating external coupling calibration operations, coupling loss, external fiber-to-switch connections, etc. Furthermore, calibration and functional verification of the individual transmit and receive sections of a transceiver is not limited to solutions that require a physical optical connection to be made external to the unit. Moreover, when the transceiver needs to be set to "normal" operation mode, no external connection that has to be physically disconnected as the integrated loopback path may simply be disabled.

While the example of embodiment of FIG. 2A illustrates a loopback comprising two switch elements, other embodiments may comprise different configuration of a variety of optical components for selectively routing the output multi-wavelength signal of a transceiver's transmitting component to its receiving component. In various embodiments, the transceiver architecture may be altered to include a continuously tunable switching element in the transceiver's output transmit path. This switching element may be comprised of (but not limited to) all or a subset of the following optical components: a semiconductor optical amplifier (SOA), a thermo-optic switch and a p-i-n diode switch. The addition of the switching element allows for the imposition of an electrical control signal to determine the routing of the optical signal from the transmitter. For a particular control condition, the switch could enable within PIC (or module) routing of the optical signal from the transmitter to the receiver. For a different control condition the same switching element could ensure that the optical signal is routed from the transmitter to the external optical link.

Figure 2B:
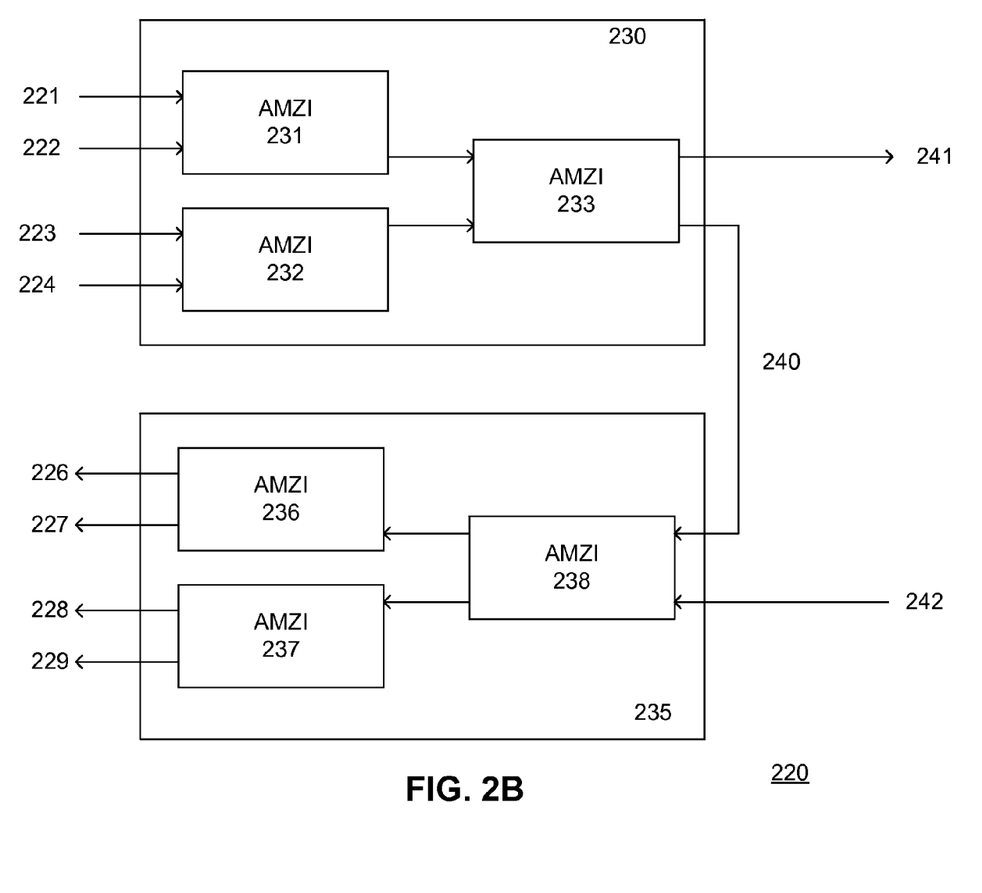
FIG. 2B-FIG. 2C illustrate a transceiver loopback circuit and circuit components according to an embodiment of the disclosure.

FIG. 2B illustrates a transceiver loopback circuit according to an embodiment of the disclosure. In this embodiment, transceiver circuit 220 comprises transmission component multiplexer 230 and receiving component multiplexer 235. Transmission component multiplexer 230 is shown to receive input signals 221-224 comprising different WDM wavelengths, and output a multi-wavelength signal to either loopback path 240 or PIC output 241. Receiving component multiplexer 235 is similarly shown to receive a multi-wavelength signal either via loopback path 240 or PIC input 242, and output each of WDM wavelengths as individual signals 226-229.

In this embodiment, each of multiplexers 230 and 235 comprises a plurality of interleavers. For example, transmission component multiplexer 230 includes 2×1 asymmetric Mach Zehnder interferometers (AMZIs) 231 and 232, and 2×2 AMZI 233; receiving component multiplexer 235 similarly comprises 2×1 AMZIs 236 and 237, and 2×2 AMZI 238. AMZI 233 of transmission component multiplexer 230 thus functions as a switch between the PIC output 241 and loopback path 240. AMZI 238 similarly functions as a switch between the PIC input 242 and loopback path 240. In other embodiments, only one of the TX or RX path may utilize an interleaver configuration. In other embodiments, the illustrated 2-stage interleavers shown in FIG. 2B may be replaced with 1-stage interleavers, or with interleaver stages larger than two.

A technical effect of transceiver circuit 220 employing interleavers for multiplexers 230 and 235 is that the switch function utilized for loopback path 240 is achieved without utilizing an additional component (such as switches 210 and 212 of FIG. 2A), as AMZIs 233 and 238 function as a loopback switch. This embodiment may lower insertion loss, create a smaller device footprint, lower power consumption, and reduce control complexity.

Figure 2C:
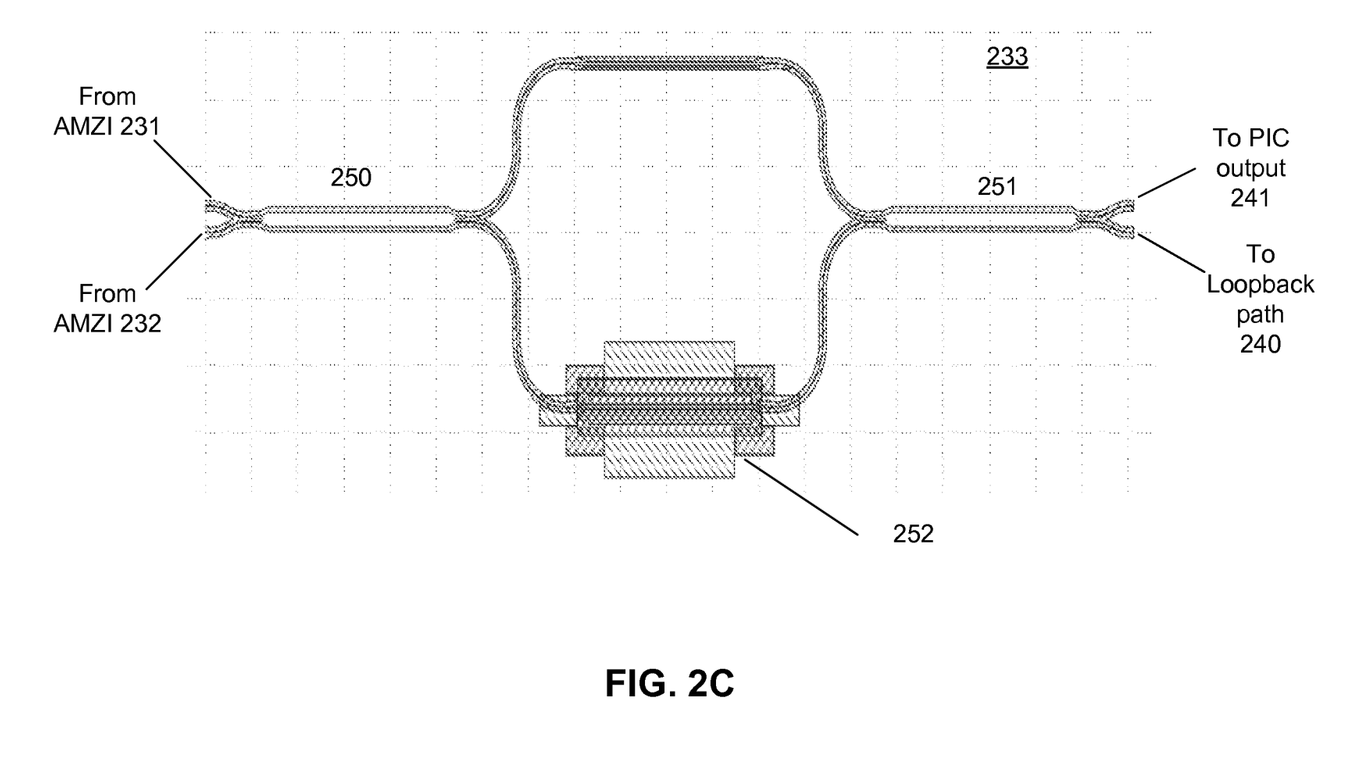

FIG. 2C is an illustration of components of 2×2 AMZI 233 according to an embodiment of the disclosure (it is to be understood that 2×2 AMZI 238 may comprise similar components). The outputs of AMZI 231 and 232 are received at multimode interference (MMI) structure 250, which can be utilized for power splitting and for the separation/combination of wavelengths or polarizations. AMZI 233 is shown to further include phase trimmer 252 to optimize and stabilize the optical filter function. The output of MMI structure 251 is controlled to be transmitted to PIC output 241 or loopback path 240.

Figure 3A:
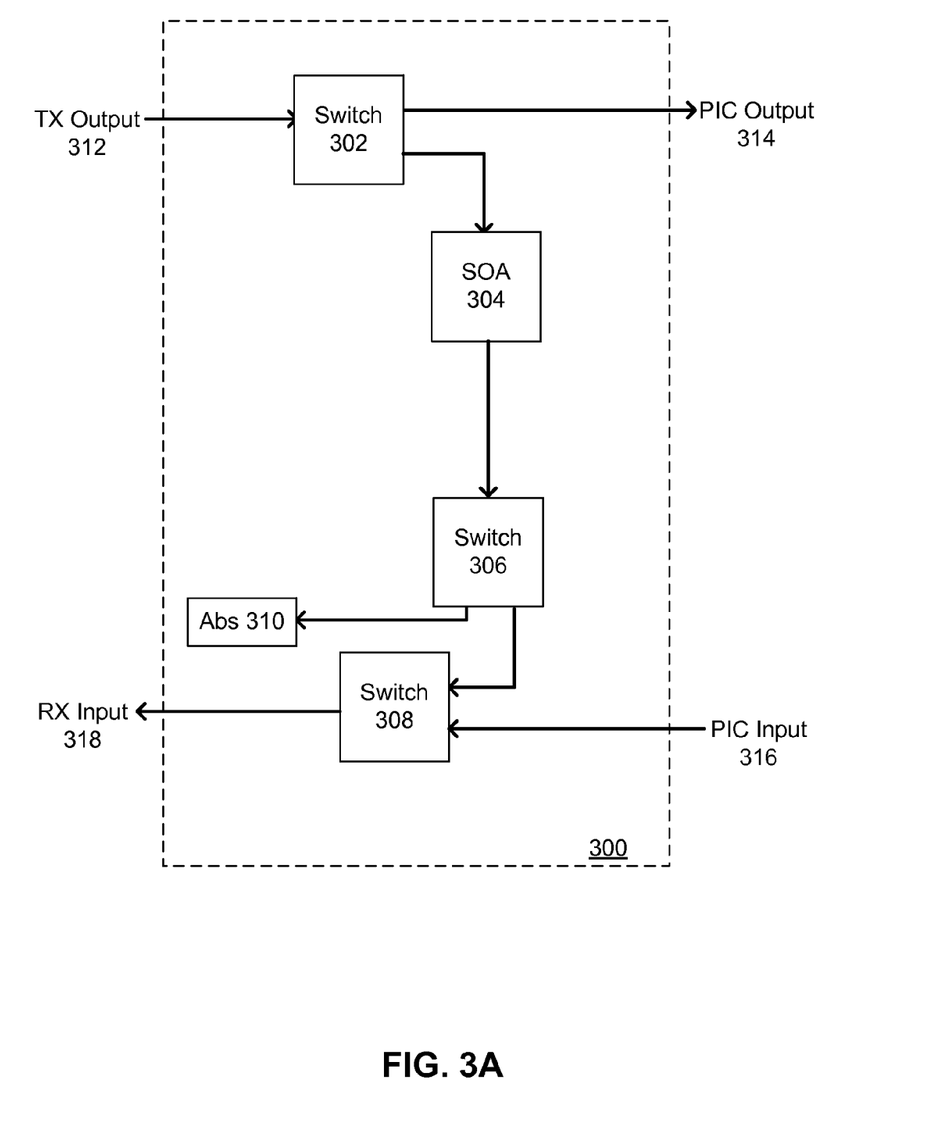
FIG. 3A-FIG. 3C illustrates various configurations for transceiver loopback paths according to embodiments of the disclosure.
Figure 3B:
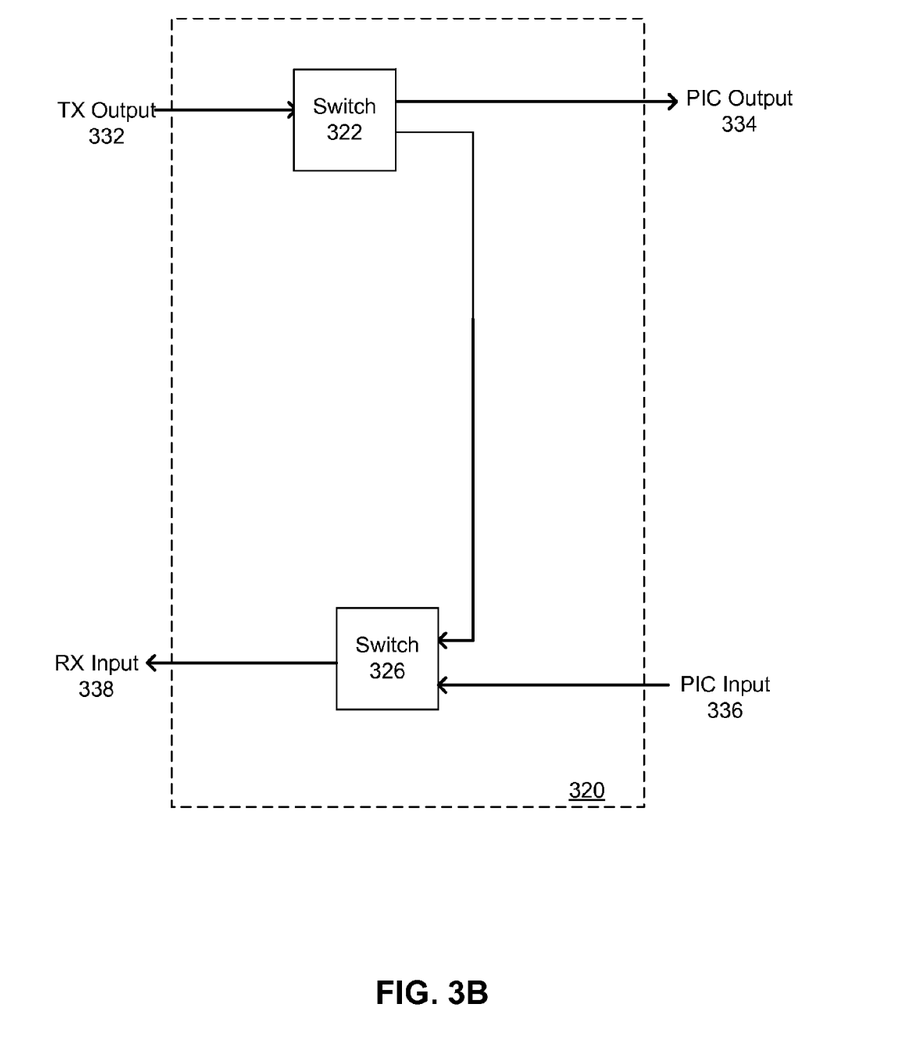
Figure 3C:
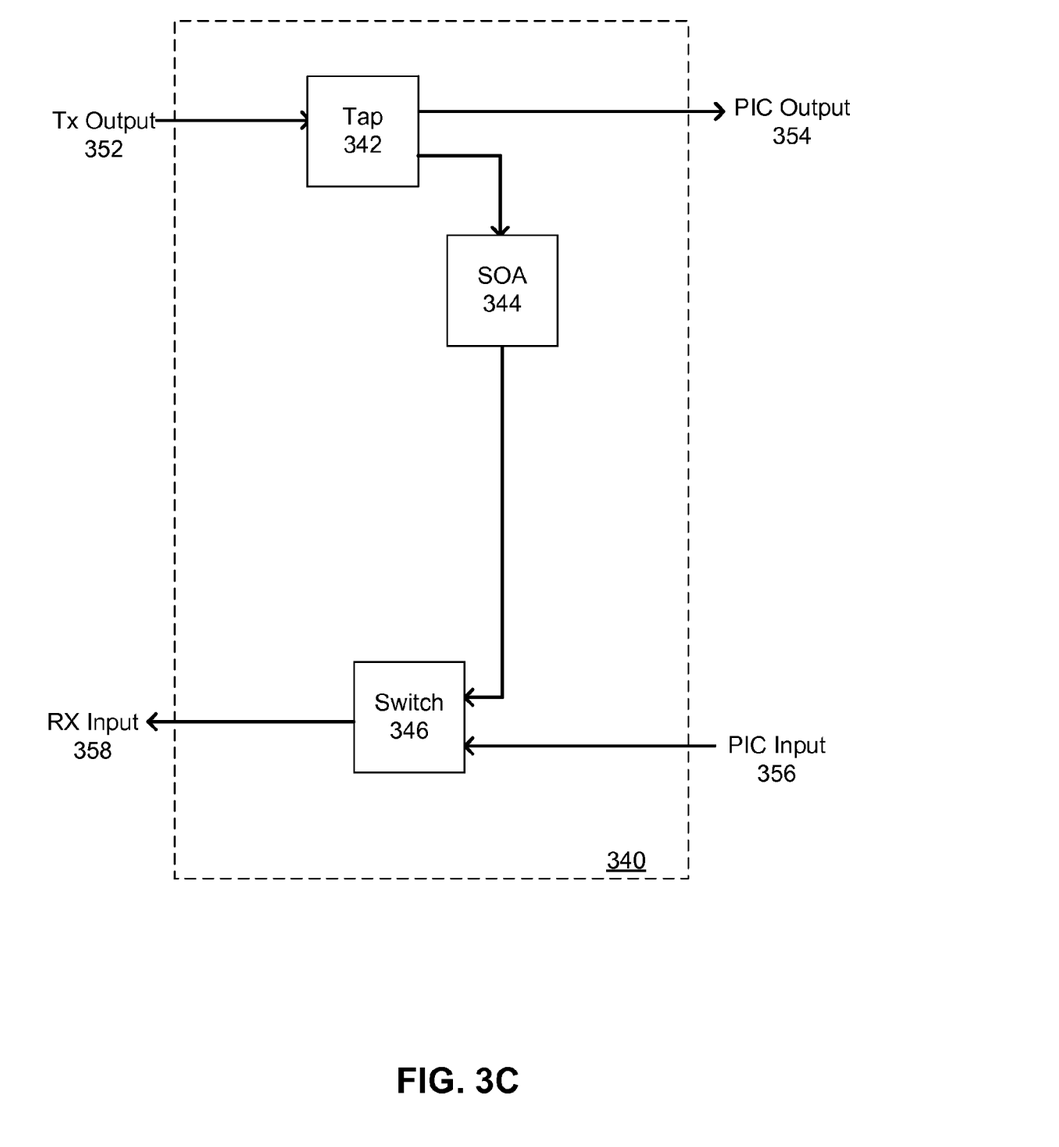

FIG. 3A-FIG. 3C illustrates various configurations for transceiver loopback paths according to embodiments of the disclosure. Loopback path 300 comprises the following functionality: when operating in loopback (i.e., when forwarding the multi-wavelength output of a transmitting element of a transceiver to a receiving element of the transceiver), the transmitting element cannot transmit any signal out of the transceiver; when not operating in loopback, the receiving element cannot receive any signals from the transmitting element.

Loopback path 300 comprises switching element 302 and semiconductor optical amplifier (SOA) 304. Switching element may comprise: a thermally tuned switch (e.g., a thermally tuned MZI), a PIN diode switch, or any other optical component capable of receiving a single input and selectively outputting it to two or more output ports; in this embodiment, switch 302 directs transmitting component output 312 to either PIC output 314, or SOA 304. When operating in loopback, a transmitter output power control circuit (not shown) may use feedback from a transmitter power monitor photodiode (not shown) to control the SOA bias current and achieve the specific transmitter output power for loopback path 300. When not operating in loopback, SOA bias current is turned off so that SOA 304 is disabled to avoid emitting any light on loopback path 300 (i.e., SOA 304 is turned off to absorb/attenuate any stray light received from switch 302).

Loopback path 300 further includes switches 306 and 308, and absorber 310. Switch 306 directs optical signals received from SOA 304 to switch 308 or absorber 310. Signals from SOA 304 are directed to absorber 310 when the transceiver is not operating in loopback (i.e., to absorb/attenuate any stray light received from SOA 304). Switch 308 directs input 318 of the receiving component of the transceiver to receive either PIC external input signal 316, or transmitting component output 312.

Transceiver loopback paths, according to embodiments of the disclosure, may comprise different configurations including more or less switches, SOAs and absorbers than the embodiments of FIG. 3A. FIG. 3B illustrates an exemplary transceiver loopback path comprising a switch at the transmitting and receiving components of the transceiver.

In this embodiment, loopback path 320 comprises optical switch 322 to receive transmitting component output 332. When operating in non-loopback, switch 332 operates such that transmitting component output 332 is PIC output signal 334. When operating in loopback, switch 322 directs transmitting component output 332 to optical switch 326; optical switch 326 directs input 338 of the receiving component of the transceiver to receive transmitting component output 332 (in loopback mode) or PIC external input signal 336 (in non-loopback mode).

In this embodiment, the use of multiple switches 322 and 326 may sufficiently avoid crosstalk of the TX signal to the RX signal when the PIC is in the non-loopback mode—i.e., where it transmits signals off-chip as PIC output 334 and receives signals from off-chip as PIC input 336. In other embodiments, these two switches may be placed in a different configuration along the loopback path from what is shown; in some embodiments, an attenuator may replace a switch. A technical effect of these embodiments is that there is more than one cascaded signal-attenuating element along the loopback path to suppress unwanted signal on the loopback path (as also shown in FIG. 3A, which utilizes both SOA (attenuator) 304 and switch 306 along loopback path 300).

FIG. 3C illustrates an exemplary transceiver loopback path comprising no optical switches at the transmitting component of the transceiver. Loopback path 340 comprises optical tap 342 and SOA 344. Tap 342 is utilized in this embodiment to extract a percentage of transmitting component output 352. When operating in loopback, a transmitter output power control circuit (not shown) may use feedback from a transmitter power monitor photodiode (not shown) to control the SOA bias current and amplify the tapped portion of transmitting component output 352. When not operating in loopback, SOA bias current is turned off so that SOA 344 is disabled to avoid emitting any light on loopback path 340 (i.e., SOA 344 is turned off to absorb/attenuate any light received from tap 342).

Loopback path 340 further includes switch 346 to direct input 358 of the receiving component of the transceiver to receive either PIC external input signal 356, or transmitting component output 352 (i.e., tapped and amplified).

Figure 4:
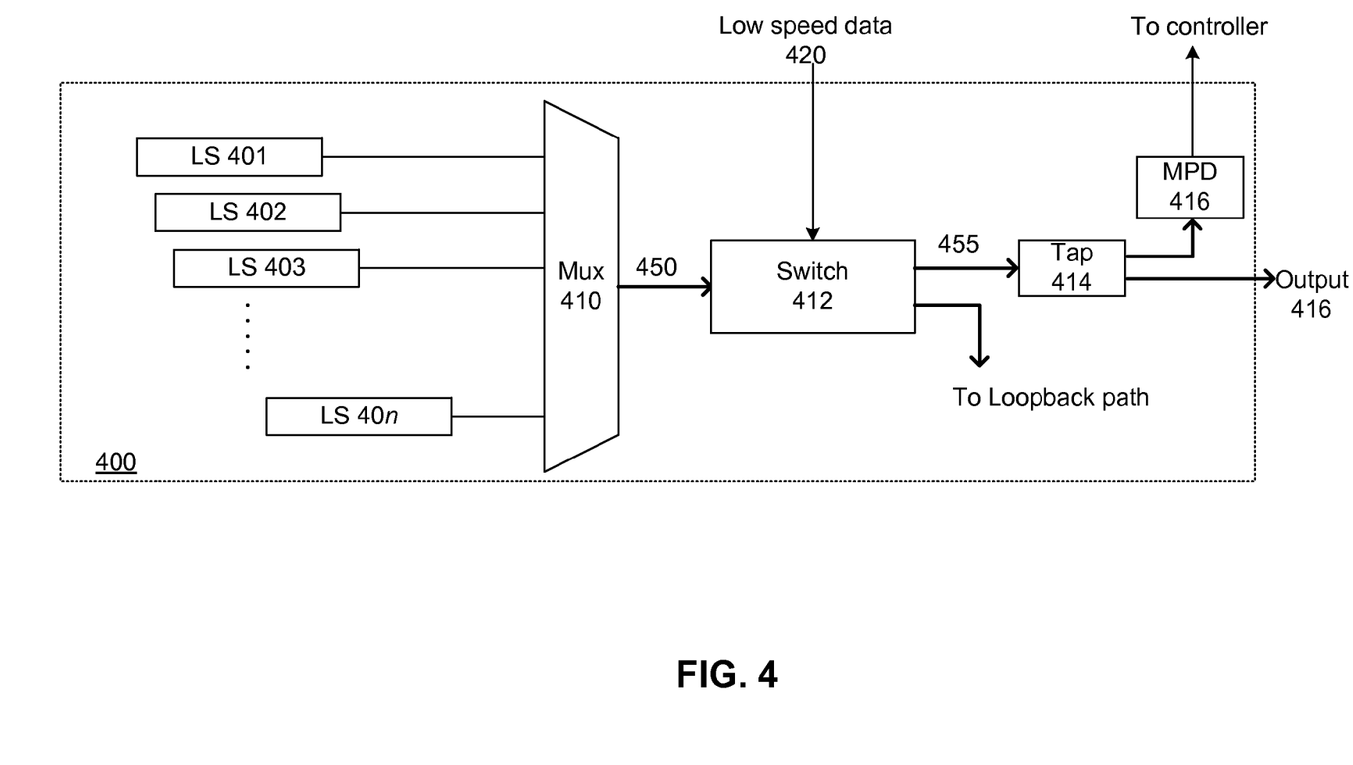
FIG. 4 is an illustration of a transmitting portion of a transceiver configured to embed low-speed communication data according to an embodiment of the disclosure.

FIG. 4 is an illustration of a transmitting portion of a transceiver configured to embed low-speed communication data according to an embodiment of the disclosure. In this embodiment, transmitting path 400 of a transceiver is shown to include tunable laser modules 401-40n to generate light, which may be further modulated based on transmission signal data. Multiplexer 410 is shown to receive n modulated signals and output signal 450 that comprises multiple wavelengths.

As described in further detail below, an optical tap and a monitor photodiode are situated at the transmit output waveguide. Such a configuration enables an electronic feedback signal to be used for the purposes of switch configuration. For example, maximizing the monitor photodiode photocurrent correlates to the switch being configured in transmit mode, while minimizing the monitor photodiode photocurrent corresponds to a within PIC configuration. A low amplitude, low-speed signal (e.g., on the order of kilobits/s) can be applied to a DC bias of the switch in order to superimpose modulated data onto the incoming signal. In the case where the input optical signal consists of an arbitrary number of multiplexed optical signals operating at high data rates (e.g., on the order of Gigabits/s), the modulation of the switch would serve as a means of simultaneously embedding a low-speed communication channel across all optical channels.

Switch 412 is controllable to output signals to either optical tap 414 or the loopback path of the transceiver (not shown). In some embodiments wherein the loopback path of this embodiment, switch 412 would be utilized to superimpose data 420 (e.g. frequency-shift keying (FSK)) onto signal 450 to generate signal 455, which is modulated at a low-speed according to data 420. In other words, multi-wavelength signal 450 may modulated as a series of low-speed pulses corresponding to data 420. The loopback path of the transceiver may comprise attenuation or absorbing components (e.g., a biased SOA, an optical absorber, etc.) to "drop" the data removed from signal 450 to generate the modulated pulses of signal 455.

Receiving circuitry to receive transceiver output 416 may comprise components or circuitry to de-modulate these low-speed pulses to recover data 420. This low-speed data may, for example, comprises maintenance or configuration data for network elements in the external link.

In embodiments where the transceiver comprises an SOA, switch 412 may a variable optical attenuator (VOA) to prevent optical saturation of the SOA. Tap 414 is shown to extract a (smaller) percentage of its input towards monitor photodiode 416, and the remaining (larger) percentage to output port 416 of the transceiver. Monitor photodiode 416 may detect signal characteristics of the output signal to control tunable lasing modules 401-40n, to determine if the transceiver is in loopback mode (i.e., when no or minimal signals are detected), etc.

Figure 5:
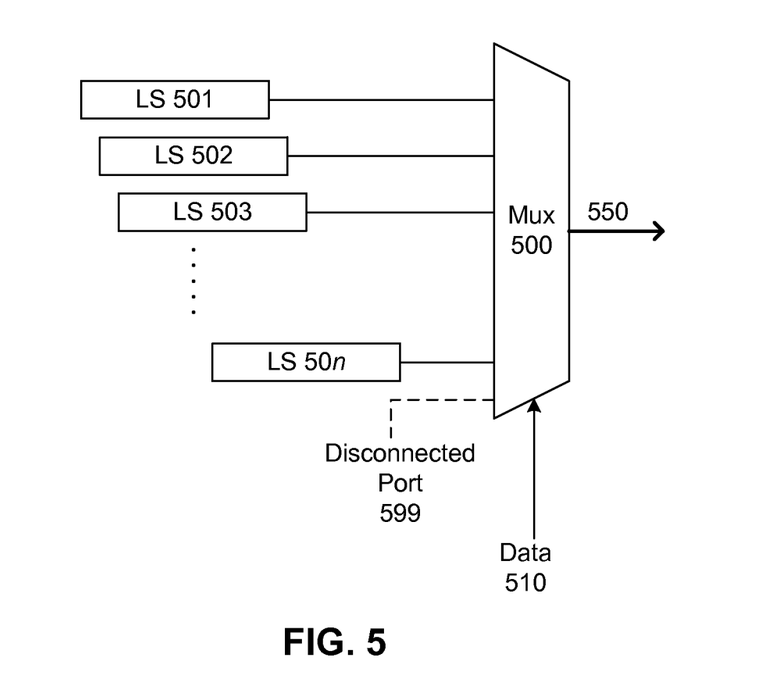
FIG. 5 is an illustration of a transmitting portion of a transceiver configured to embed low-speed communication data according to an embodiment of the disclosure.

FIG. 5 is an illustration of a transmitting portion of a transceiver configured to embed low-speed communication data according to an embodiment of the disclosure. In this embodiment, multiplexer 500 is shown to receive n modulated signals from tunable laser modules 501-50n, and output signal 550 that comprises multiple wavelengths.

In this embodiment, multiplexer 500 is itself controlled such that output signal 550 is modulated according to data 510. For example, a multiplexer enable signal may be gated such that output signal 550 is "pulsed" at a low speed according to data 510. In another example, a disconnected port of multiplexer 500 (shown as disconnected port 599) may be periodically selected according to data 510 so that that output signal 550 is "pulsed" at a low speed according to data 510. Other circuitry and processes may be utilized to modulate the output signal of multiplexer 500 at a low speed according to data 510.

Figure 6:
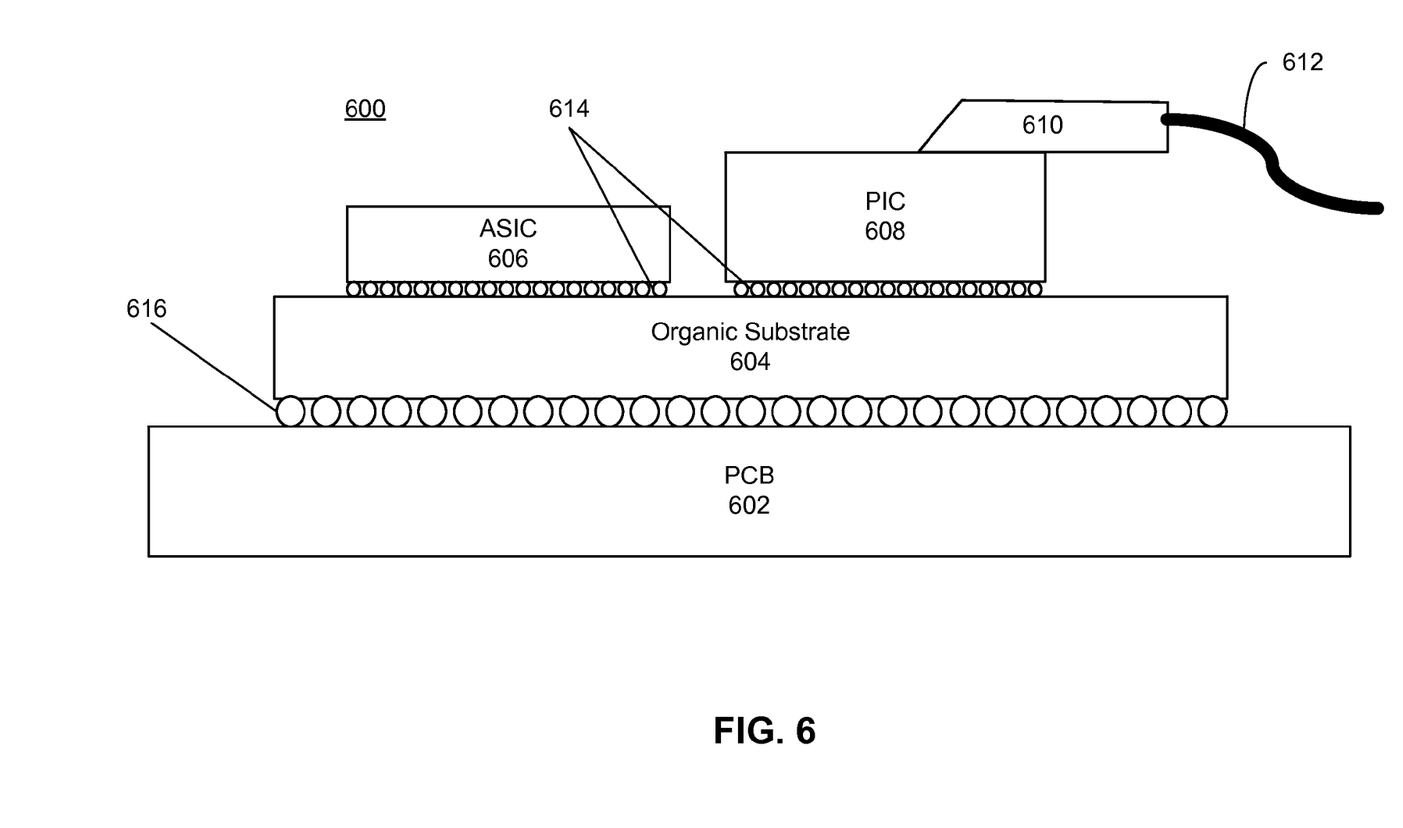
FIG. 6 is an illustration of a system including one or more loopback or data imposing components according to an embodiment of the disclosure.

FIG. 6 is an illustration of a system including one or more loopback or data imposing components according to an embodiment of the disclosure. In this embodiment, system 600 is shown to include printed circuit board (PCB) substrate 602, organic substrate 604, application specific integrated circuit (ASIC) 606, and PIC 608, which may include any of the transceivers comprising loopback paths and/or low-speed data modulation embodiments discussed above. PIC 608 exchanges light with fiber 612 via prism 610; said prism is a misalignment-tolerant device used to couple an optical mode on to a single mode optical fiber. The optical devices of PIC 608 are controlled, at least in part, by control circuitry included in ASIC 606. As discussed above, the efficiency of optical couplings between the components described above may be limited by processing fabrication techniques. System 600 may include any of the waveguide transitions discussed above.

Both ASIC 606 and PIC 608 are shown to be disposed on copper pillars 614, which are used for communicatively coupling the ICs via organic substrate 604. PCB 608 is coupled to organic substrate 604 via ball grid array (BGA) interconnect 616, and may be used to interconnect the organic substrate (and thus, ASIC 606 and PIC 608) to other components of system 600 not shown—e.g., interconnection modules, power supplies, etc.

Figure 7:
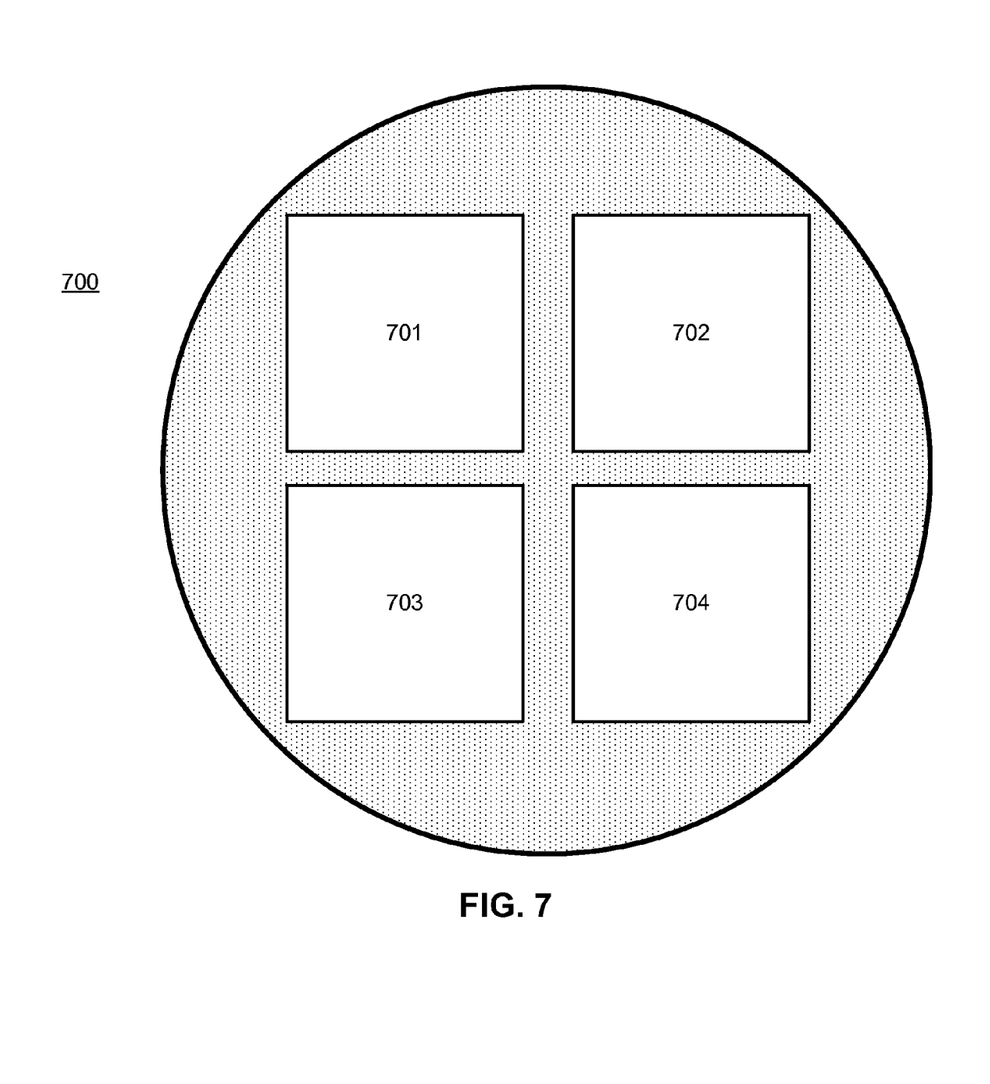
FIG. 7 is an illustration of a semiconductor wafer comprising a plurality of photonic integrated circuits according an embodiment of the disclosure.

FIG. 7 is an illustration of a semiconductor wafer comprising a plurality of PICs according an embodiment of the disclosure. In this embodiment, semiconductor wafer 700 is an un-singulated wafer and comprises heterogeneous material. Wafer 700 is shown to include PICs 701-704 (the number of PICs illustrated to be included in wafer 700 is for exemplary purposes only). Each of the PICs 701-704 may comprise any of the transceivers with integrated loopback paths discussed above.

Wafer 700 may be subsequently segmented such that PICs 701-704 are each included in a single die (i.e., singulated). Prior to singulation, the optical I/O interfaces of each of PICs 701-704 may not be accessible. PICs utilizing the integrated loopback paths discussed above can use electrical signals to verify the functionality of the transceivers—i.e., the transmission and receiving components of each of the PICs. For example, the optical components of a transmission component of PIC 701 can be electrically stimulated to generate an output. The loopback path of PIC 701 can also be electrically controlled to route the output signal of the transmission component to a receiving component of PIC 701. Elements of the receiving component of PIC 701 can be electrically measured to determine whether the output signal from the transmission component is received. Thus, each of the PICs of wafer 700 can be verified using purely electrical signals (i.e., without accessing the PIC optical I/O interfaces); verification at this stage of processing allows for the utilization of equipment developed for the microelectronics industry to execute rapid, inexpensive, and automated quality control and yield characterization. Performing characterization at the wafer scale can, for example, save unnecessary sample preparation and packaging activities on PICs that did not yield.

The above described embodiments of the disclosure may comprise SOI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

Embodiments describe a semiconductor wafer comprising heterogeneous semiconductor material comprising a silicon semiconductor material and a non-silicon semiconductor material, and a plurality of photonic integrated circuits (PICs) formed from the heterogeneous semiconductor material. Each of the plurality of PICs comprises a transmission component comprising an array of laser modules to produce light having different optical WDM wavelengths onto a plurality of optical paths, and a multiplexer having a plurality of inputs to receive light from each of the plurality of optical paths and to output an output WDM signal comprising the different optical WDM wavelengths, a receiving component comprising a de-multiplexer to receive an input WDM signal comprising the different optical WDM wavelengths and to output each of the different WDM wavelengths on a separate optical path, a waveguide for routing the output WDM signal of the transmission component to the receiving component, and one or more routing control components to control the routing of the output WDM signal of the transmission component to the receiving component.

In some embodiments, the one or more routing components of each of the PICs comprises a tap and a semiconductor optical amplifier (SOA) to selectively amplify the output WDM signal of the transmitting component. In some embodiments, the non-silicon semiconductor material comprises at least one of III-V material, magneto-optic material, or crystal substrate material.

Embodiments describe an apparatus comprising a PIC including a transmission component comprising an array of laser modules to produce light having different optical WDM wavelengths onto a plurality of optical paths, and a multiplexer having a plurality of inputs to receive light from each of the plurality of optical paths and to output an output WDM signal comprising the different optical WDM wavelengths, a receiving component comprising a de-multiplexer to receive an input WDM signal comprising the different optical WDM wavelengths and to output each of the different WDM wavelengths on a separate optical path a waveguide for routing the output WDM signal of the transmission component to the receiving component, and one or more routing control components to control the routing of the output WDM signal of the transmission component to the receiving component.

In some embodiments, the one or more routing control components of the PIC comprises an optical switch to receive the output WDM signal of the transmission component, and to route the output WDM signal to the waveguide for routing the output WDM signal of the transmission component to the receiving component or a PIC output based on a received control signal. In some embodiments, the optical switch comprises at least one of an MZI or a P-I-N diode. In some embodiments, the one or more routing components of the PIC comprises an optical switch disposed at the input of the receiving component, wherein the optical switch configured to receive the output WDM signal of the transmitting component, and selectively send the output WDM signal to the receiving component. In some embodiments, the one or more routing components of the PIC comprises an absorber to attenuate the output WDM signal of the transmitting component when it is not to be sent to the receiving component. In some embodiments, the optical switch is to drop or attenuate the output WDM signal of the transmitting component when it is not to be sent to the receiving component. In some embodiments, the one or more routing components of the PIC further comprises a second optical switch to receive the output WDM signal of the transmission component, and to route the output WDM signal to the waveguide for routing the output WDM signal of the transmission component to the optical switch disposed at the input of the receiving component based on a received control signal.

In some embodiments, the one or more routing components of the PIC comprises a tap and an SOA to selectively amplify the output WDM signal of the transmitting component.

In some embodiments, the multiplexer of the transmission component comprises an AMZI to control the routing of the output WDM signal of the transmission component to one of the waveguide for routing the output WDM signal of the transmission component to the receiving component or a PIC output.

In some embodiments, the de-multiplexer of the receiving component comprises an AMZI to select the input WDM signal of the receiving component from one of the waveguide for routing the output WDM signal of the transmission component to the receiving component or a PIC input.

Embodiments describe a transmission component comprising an array of laser modules to produce light having different optical WDM wavelengths onto a plurality of optical paths, a multiplexer having a plurality of inputs to receive light from each of the plurality of optical paths and to output an output WDM signal comprising the different optical WDM wavelengths, and circuitry to selectively pulse the output WDM signal according to received data to impose the received data on the output WDM signal, and an output port to output the pulsed output WDM signal.

In some embodiments, the circuitry to selectively pulse the output WDM signal comprises an optical switch disposed between the multiplexer and the output port to generate the pulsed output WDM signal by alternately sending the output WDM signal to the output port and sending the WDM output signal to a drop port. In some embodiments, the circuitry to selectively pulse the output WDM comprises circuitry to selectively gate control signals for the multiplexer to generate the pulsed output WDM signal.

The invention claimed is:

1. A semiconductor wafer comprising:
heterogeneous semiconductor material comprising a silicon semiconductor material and a non-silicon semiconductor material; and
a plurality of photonic integrated circuits (PICs) formed from the heterogeneous semiconductor material, wherein each of the plurality of PICs comprises:
a transmission component comprising:
an array of laser modules to produce light having different optical WDM wavelengths onto a plurality of optical paths; and
a multiplexer having a plurality of inputs to receive light from each of the plurality of optical paths and to output an output WDM signal comprising the different optical WDM wavelengths;
a receiving component comprising a de-multiplexer to receive an input WDM signal comprising the different optical WDM wavelengths and to output each of the different WDM wavelengths on a separate optical path, at least one of the multiplexer or the de-multiplexer comprising an asymmetric Mach Zehnder interferometer-based interleaver configured to function as a switch;

a waveguide for routing the output WDM signal of the transmission component to the receiving component; and one or more routing control components to control the routing of the output WDM signal of the transmission component to the receiving component.

2. The semiconductor wafer of claim 1, wherein the one or more routing components of each of the PICs comprises a tap and a semiconductor optical amplifier (SOA) to selectively amplify the output WDM signal of the transmitting component.

3. The semiconductor wafer of claim 1, wherein the non-silicon semiconductor material comprises at least one of III-V material, magneto-optic material, or crystal substrate material.

4. An apparatus comprising:
a photonic integrated circuit (PIC) including:
    a transmission component comprising:
        an array of laser modules to produce light having different optical WDM wavelengths onto a plurality of optical paths; and
        a multiplexer having a plurality of inputs to receive light from each of the plurality of optical paths and to output an output WDM signal comprising the different optical WDM wavelengths;
    a receiving component comprising a de-multiplexer to receive an input WDM signal comprising the different optical WDM wavelengths and to output each of the different WDM wavelengths on a separate optical path, at least one of the multiplexer or the de-multiplexer comprising an asymmetric Mach Zehnder interferometer-based interleaver configured to function as a switch;
    a waveguide for routing the output WDM signal of the transmission component to the receiving component; and
    one or more routing control components to control the routing of the output WDM signal of the transmission component to the receiving component.

5. The apparatus of claim 4, wherein the one or more routing control components of the PIC comprises:
    an optical switch to receive the output WDM signal of the transmission component, and to route the output WDM signal to the waveguide for routing the output WDM signal of the transmission component to the receiving component or a PIC output based on a received control signal.

6. The apparatus of claim 5, wherein the optical switch comprises at least one of a Mach Zehnder Interferometer (MZI) or a P-I-N diode.

7. The apparatus of claim 4, wherein the one or more routing components of the PIC comprises:
    an optical switch disposed at the input of the receiving component, wherein the optical switch configured to receive the output WDM signal of the transmitting component, and selectively send the output WDM signal to the receiving component.

8. The apparatus of claim 7, wherein the one or more routing components of the PIC comprises an absorber to attenuate the output WDM signal of the transmitting component when it is not to be sent to the receiving component.

9. The apparatus of claim 7, wherein the optical switch is to drop or attenuate the output WDM signal of the transmitting component when it is not to be sent to the receiving component.

10. The apparatus of claim 7, wherein the one or more routing components of the PIC further comprises:
    a second optical switch to receive the output WDM signal of the transmission component, and to route the output WDM signal to the waveguide for routing the output WDM signal of the transmission component to the optical switch disposed at the input of the receiving component based on a received control signal.

11. The apparatus of claim 4, wherein the one or more routing components of the PIC comprises a tap and a semiconductor optical amplifier (SOA) to selectively amplify the output WDM signal of the transmitting component.

12. The apparatus of claim 4, wherein the multiplexer of the transmission component comprises:
    an asymmetrical Mach Zehnder Interferometer (AMZI) to control the routing of the output WDM signal of the transmission component to one of the waveguide for routing the output WDM signal of the transmission component to the receiving component or a PIC output.

13. The apparatus of claim 4, wherein the de-multiplexer of the receiving component comprises:
    an asymmetrical Mach Zehnder Interferometer (AMZI) to select the input WDM signal of the receiving component from one of the waveguide for routing the output WDM signal of the transmission component to the receiving component or a PIC input.

* * * * *